United States Patent
Wells et al.

(10) Patent No.: US 11,882,324 B1
(45) Date of Patent: Jan. 23, 2024

(54) RECONCILIATION FOR PARALLEL TRANSCODING

(71) Applicant: Amazon Technologies, Inc., Reno, NV (US)

(72) Inventors: Trevor Wells, Washougal, WA (US); Ryan Hegar, Happy Valley, OR (US); Colin McCoy, Lake Oswego, OR (US); Krishna Sankaran, Cupertino, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 17/465,138

(22) Filed: Sep. 2, 2021

(51) Int. Cl.
*H04N 21/2343* (2011.01)
*H04N 21/235* (2011.01)

(52) U.S. Cl.
CPC . *H04N 21/234336* (2013.01); *H04N 21/2353* (2013.01); *H04N 21/234381* (2013.01)

(58) Field of Classification Search
CPC ... H04N 21/234336; H04N 21/234381; H04N 21/2353
See application file for complete search history.

(56) References Cited

U.S. PATENT DOCUMENTS

| | | | | |
|---|---|---|---|---|
| 10,310,928 B1* | 6/2019 | Hegar | ............ | G06F 3/0635 |
| 10,469,860 B1* | 11/2019 | Zhang | ............ | H04N 19/48 |
| 10,880,585 B1* | 12/2020 | Waggoner | ............ | H04N 19/64 |
| 11,272,227 B1* | 3/2022 | Enigma | ............ | H04N 21/8456 |
| 2004/0264580 A1* | 12/2004 | Chiang Wei Yin | .. | H04N 19/115 375/E7.176 |
| 2008/0212690 A1* | 9/2008 | Loukas | ............ | H04N 19/40 375/E7.198 |
| 2009/0310669 A1* | 12/2009 | Konoshima | ............ | H04N 19/40 375/E7.026 |
| 2013/0117418 A1* | 5/2013 | Mutton | ............ | H04N 21/8456 709/219 |
| 2013/0308638 A1* | 11/2013 | Grossman | ............ | H04N 21/64322 370/390 |
| 2014/0380376 A1* | 12/2014 | Schmidt | ............ | H04N 21/4385 725/54 |
| 2015/0261600 A1* | 9/2015 | Iturralde | ............ | H04N 21/236 714/747 |
| 2015/0381978 A1* | 12/2015 | Dunphy | ............ | H04N 19/114 375/240.02 |

(Continued)

FOREIGN PATENT DOCUMENTS

| | | | | |
|---|---|---|---|---|
| CN | 109348309 A | * | 2/2019 | ..... H04N 21/234309 |
| EP | 1465430 A2 | * | 10/2004 | ........... H04N 19/115 |
| WO | WO-2022073596 A1 | * | 4/2022 | ....... H04N 21/44004 |

*Primary Examiner* — James R Sheleheda
(74) *Attorney, Agent, or Firm* — Hogan Lovells US LLP

(57) ABSTRACT

A transcoding process may be performed in parallel, which may include different nodes processing different segments of a media file at different times. Different time slices of media files may have different properties, which may lead to errors when media files are encoded for later playback. Extracting metadata from frames of media files and evaluating the frames for discrepancies enables creation of a reconciliation manifest to correct discrepancies associated with the media file. As the transcoding process is performed, the reconciliation manifest may be reference to generate an output media file.

20 Claims, 8 Drawing Sheets

(56) References Cited

U.S. PATENT DOCUMENTS

| | | | |
|---|---|---|---|
| 2016/0191961 A1* | 6/2016 | Fisher | H04N 21/234309 |
| | | | 725/116 |
| 2017/0353516 A1* | 12/2017 | Gordon | H04N 21/2402 |
| 2018/0034880 A1* | 2/2018 | Choi | H04L 65/765 |
| 2018/0192158 A1* | 7/2018 | Smith | H04N 21/23418 |
| 2018/0310032 A1* | 10/2018 | Reitmeyer | H04N 21/234309 |
| 2019/0068673 A1* | 2/2019 | Giladi | H04L 65/762 |
| 2019/0090035 A1* | 3/2019 | Eksten | H04N 21/458 |
| 2019/0394538 A1* | 12/2019 | Caulfield | H04L 65/75 |
| 2020/0029086 A1* | 1/2020 | Zou | H04N 19/436 |
| 2020/0296451 A1* | 9/2020 | Hassler | H04N 21/83 |
| 2020/0344510 A1* | 10/2020 | McMurray | H04N 21/234309 |
| 2021/0329351 A1* | 10/2021 | Giladi | H04N 21/26258 |
| 2022/0210518 A1* | 6/2022 | Smith | H04N 21/4854 |
| 2023/0011518 A1* | 1/2023 | Chadwick | H04N 21/2387 |

* cited by examiner

RECONCILIATION FOR PARALLEL TRANSCODING

BACKGROUND

Users are increasingly obtaining content in digital form, often downloading or streaming that content from a remote service. The content is often uploaded in a high quality format, and transcoded into various other formats appropriate for playback on various types of devices. Content may be transcoded by breaking the content into different jobs that are then executed in parallel, which speeds up the process, but may lead to suboptimal transcodes when there are problems with one or more frames.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to one or more systems or methods for accelerated transcoding that utilizes a reconciliation manifest (e.g., manifest) for video frames contained in an input asset. The reconciliation manifest may be generated using metadata extracted from video frames during a demuxing and/or decoding operation, where the metadata is acquired without having the entire video asset. In this manner, specific information may be extracted without the time and processing resources utilized for processing an entire video asset before an actual transcoding process. In at least one embodiment, an initial transcode stage includes a demuxer and pseudo decoder that captures metadata outputs from for video frames. During processing, encoded video bits may remain unprocessed (e.g., decoded), but metadata data is acquired. During later processing steps, the metadata may be used during data normalization to generate a reconciliation manifest. This reconciliation manifest may then be used for later stages, where the reconciliation manifest may be referenced during an encoding process, by way of example. Accordingly, discontinuities or transcoding errors can be rapidly detected and adjusted using information from the reconciliation manifest, rather than during a full decoding/encoding process. Furthermore, embodiments enable processing of different types of video files, such as those with different frame rates, without later discontinuities in the event different segments are processed in parallel.

Various other such functions can be used as well within the scope of the various embodiments as would be apparent to one of ordinary skill in the art in light of the teachings and suggestions contained herein.

Figure 1:
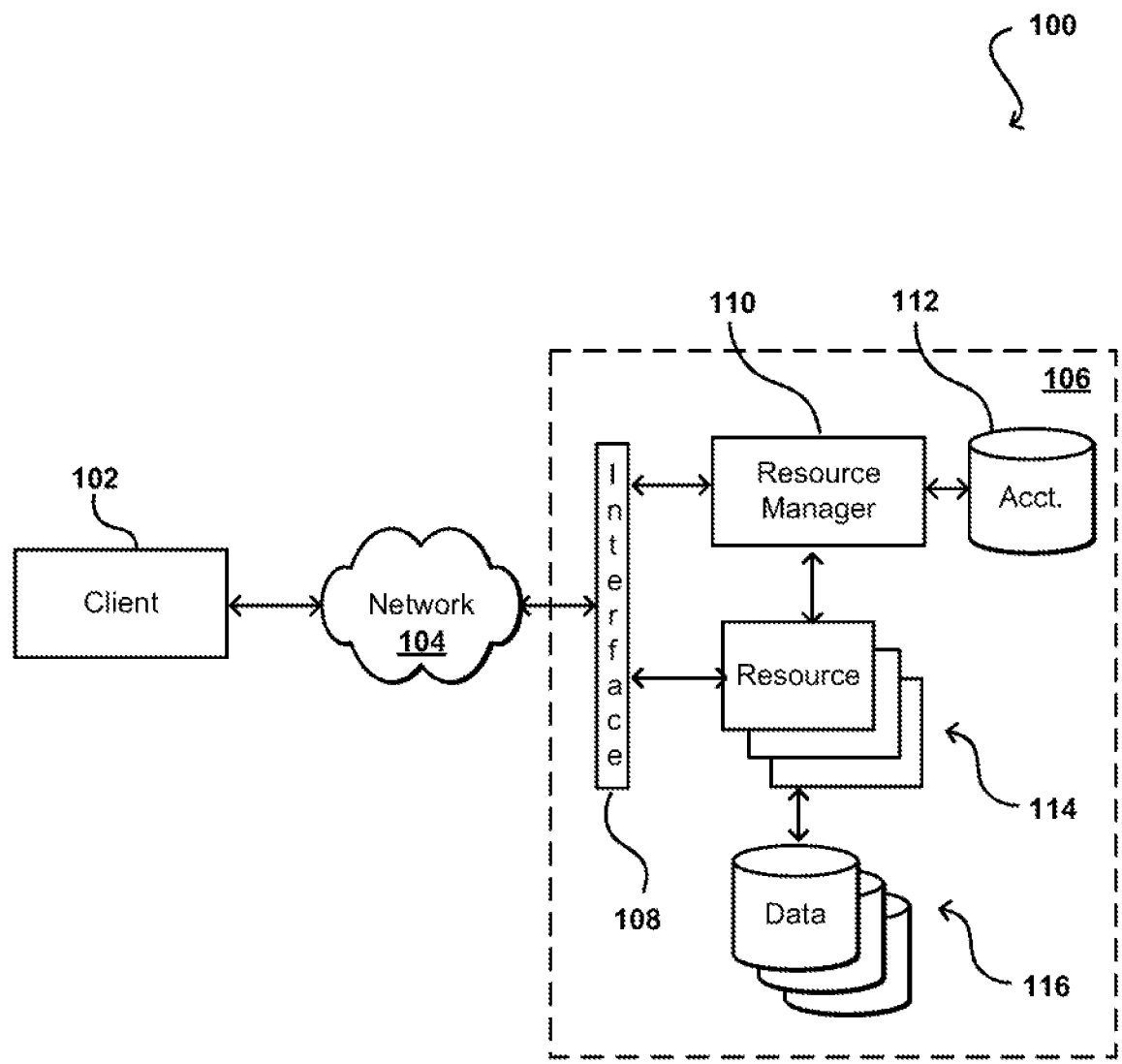
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
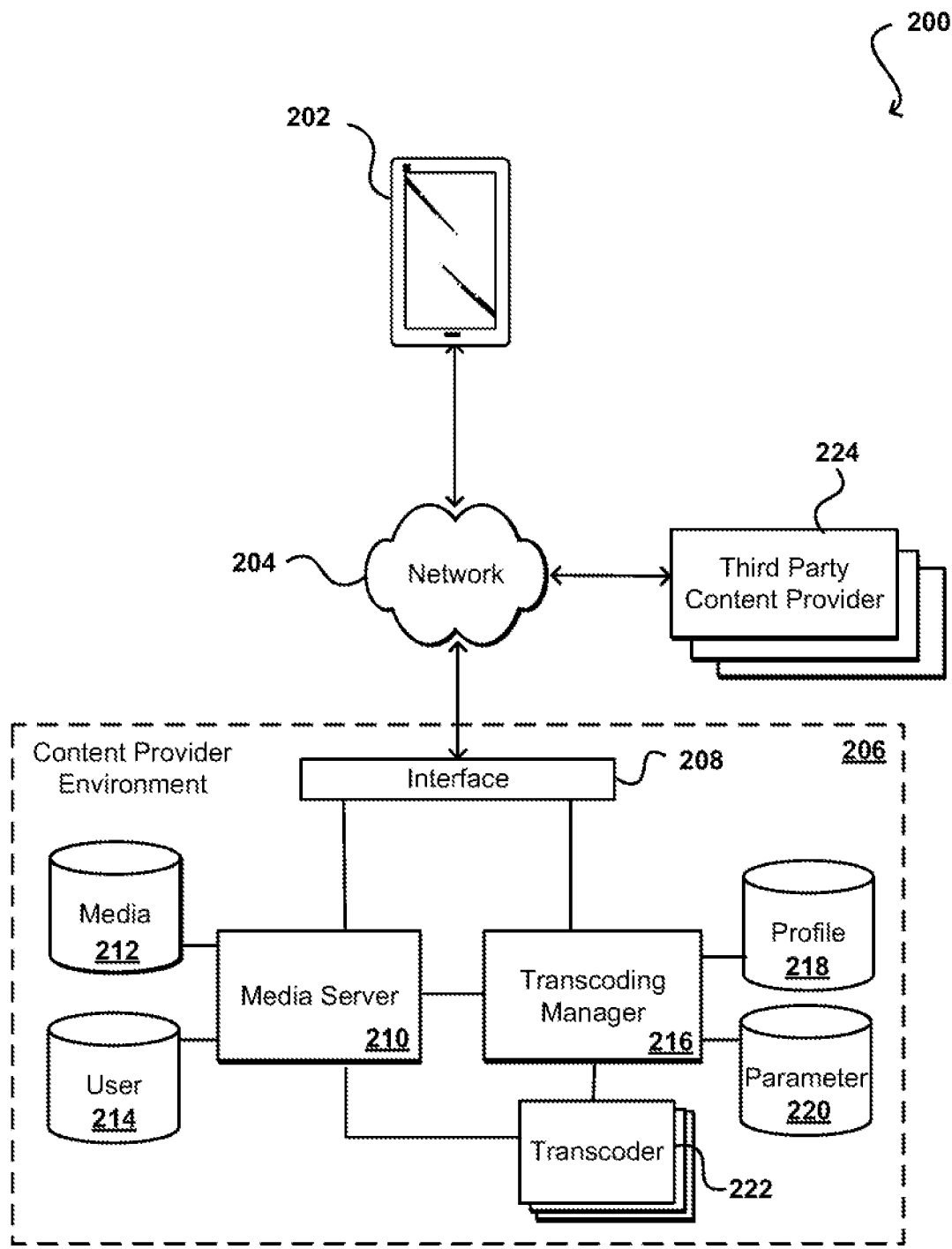
FIG. 2 illustrates an example subsystem for managing media file transcoding that can be utilized in accordance with various embodiments.

FIG. 2 illustrates an example system 200 that can be used to implement aspects of the various embodiments, in an electronic environment such as that discussed with respect to FIG. 1. In the system of FIG. 2, a client computing device 202 can submit a request for content across at least one network 204 to be received by a content provider environment 206. As mentioned, in at least some embodiments the request can include a request for content to be displayed on the computing device 202, and in many cases will include video or other media content that is transcoded for presentation on the client device 202. The network(s) can include any appropriate network, such as the Internet, a local area network (LAN), a cellular network, an Ethernet, or other such wired and/or wireless network. The content provider environment 206 can include any appropriate resources for providing content from a resource provider, as may include various servers, data stores, and other such components known or used for providing content from across a network (or from the "cloud"). As mentioned elsewhere herein, the client computing device 202 can be any appropriate computing or processing device, as may include a desktop or notebook computer, smartphone, tablet, wearable computer (i.e., smart watch, glasses, or contacts), set top box, or other such system or device. An interface layer 208, when receiving a request or call, can determine the type of call or request and cause information to be forwarded to the appropriate component or sub-system. For example, a request for content might be forwarded to a media server 210 while a request to specify encoding parameters might be forwarded to a transcoding manager 216, among other such options. These calls or requests can also come from third parties, although third party providers 224 can also provide at least some of the media content to be stored to a media repository 212 and transcoded for display on the client device 202 as discussed herein.

In this example, a call received to the content provider environment 206 can be received by an interface layer 208 of the environment. As known for network environments, the interface layer can include components such as interfaces (e.g., APIs), load balancers, request and/or data routers, and the like. If the request is a request for content, such as for a video data stream to be provided to the client device 202, information for the request can be directed to one or more media servers 210, which can obtain the content from a media data store 212 or other such repository to be sent back across the network(s) to the computing device. In some embodiments, information for the request might also be compared against user data in a user data store 214 or other such location to determine, for example, whether the user has access rights to that content, and potentially the formats or versions to which the user has access rights.

In at least some embodiments a request from an operator, an administrator, a client device 202, third party providers 224, or another such source might include a request to specify one or more sets of encoding parameters to be used with a media file. Accordingly, information regarding the encoding parameters can be provided to a transcoding manager 216, or other such component or service, that is able to receive the information through an appropriate interface (i.e., an API or console) and cause the profile and parameter data to be stored to appropriate repositories 218, 220 as discussed elsewhere herein. When a request for a video file is received, the transcoding manager 216 can use the profile and parameter data to determine the appropriate encoding information, and can pass that to one or more transcoders 222, which can obtain the media file and transcode the media file per the transcoding information, which can then be provided to the client device by the media server 210 or other such component.

Transcoding generally relates to the decoding and re-encoding of digital content from one format to another. Transcoding is often necessary to enable playback of media on different devices. It can be used to convert a digital audio, video file, and video streams from one digital form or codec to another (e.g. MPEG2 to h.264 transcoding). Transcoding can also be used to adjust the bit rate of a video file and resize video resolution. Transcoding takes place in order for content to reach multi-screen end-user destinations. The complexity of transcoding comes from the vast range of devices, networks, and channels that may need to be supported. Further, in many instances, the presentation of textual information can be an important part of the digital content and can add to the complexity of transcoding the digital content. The content, once transcoded, can be delivered using a system such as a content delivery network. A content delivery network (CDN) is an interconnected network of computer nodes that contain copies of various types of data. Using a CDN can improve access to the data cached at the nodes by increasing access bandwidth/redundancy and reducing access latency. CDNs are often used to provide access to media content.

It should be noted that the term "transcoding" is often associated with a template, manifest, profile, or a workflow in this disclosure; however the various features of this disclosure are not limited to changing the encoding format of media and, in some embodiments, may not include changing the encoding format at all. For example, a profile, manifest, or workflow may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In some embodiments the transcoding subsystem includes one or more transcoders, a set of bitstreams (or video signals), and one or more CDNs. The one or more transcoders can include both encoders and packagers, which can be implemented via an origin server. A packager can receive a signal (e.g., feed), such as a video signal or a live stream. The live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. The packager may receive one or more input signals (e.g., input) and generate one or more bitstreams. The bitstreams can be delivered by an encoder/packager to the CDN. The bitstreams can represent various encoded/packaged versions of the signal feed, as may be encoded per the encoding parameters from the transcoding manager 216. For example, the bitstream may be a high resolution and/or high bitrate version of the signal feed. In some embodiments, different bitstreams may provide alternate audio (e.g., different languages) and/or closed captions. The number and/or types of the bitstreams may be varied per the profile or other data.

Each of the bitstreams may comprise a number of content segments, which may represent a portion of the bitstream. Each of the content segment files may represent one segment of playback time of the program feed (e.g., 10 second segment files may contain 10 seconds of video and/or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN may reduce an amount of storage needed at each node of the CDN. The CDN itself may include a network of computers (e.g., servers). Each of the computers of the CDN can function as a node, and the CDN can store and/or deliver the bitstreams over a wide-area network (e.g., the Internet).

An encoder/packager can be an origin active bitrate video HTTP server. The encoder/packager can receive a signal (e.g., request) and send a signal (e.g., response). The signal request can represent a data request (e.g., an HTTP request) from one of the client devices forwarded to the origin server by the CDN. For example, the signal request may be an HTTP request for the origin server to send digital data to one of the client devices. The signal response may represent a data response from the origin server to be forwarded by the CDN to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The origin server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN). The TTL value may represent an amount of time, a number of requests and/or a hop count before the object is refreshed (e.g., requested/ updated from the origin server). The TTL value for the manifest file and/or the content segments may be set by the operator and/or set at the origin server. In a common CDN implementation, various types of content may remain stored on the CDN until the TTL value expires (e.g., content invalidation may take a long time). Generally, the TTL value of the manifest file is less than the TTL value of the content segments. A lower TTL value for the manifest file may allow the manifest file to be refreshed more frequently/often than the content segments (e.g., to update the pointers to the content segments). A comparatively higher TTL value for the content segments may allow the content segments to remain in cache longer (e.g., to reduce a number of requests made to and/or reduce a load on the origin server). The implementation and/or values set for the TTL values of the manifest file and/or the content segments may be varied according to the design criteria of a particular implementation.

The origin server may be configured to perform a content invalidation. For example, one or more of the content segments may be invalidated. Content invalidation may prevent and/or stop content from being delivered to the client devices. To initiate an invalidation of content the operator may send the invalidation signal input (e.g., the operator initiated content invalidation) to the origin server. The origin server may invalidate the content segments by updating (or manipulating) the manifest file. For example, the manifest file may be updated to no longer point to the content segments. Since the TTL value for the manifest file is relatively low, the manifest file may be refreshed throughout the CDN. For example, the client device may request the manifest file and when the TTL value expires for the cached manifest in the various nodes of the CDN, the updated manifest file (e.g., the invalidated manifest) may be distributed throughout the CDN to the client device.

A change in video stream may be initiated by a user in one example. In another example, a quality of service test may be implemented. For example, if the video stream represented using the content segments was of such a poor quality that an advertiser and/or a broadcaster would not be satisfied, the content segments may be rearranged (e.g., by providing the alternate content) and/or removed quickly. For example, if the content segments represent an advertisement of poor quality (e.g., fails the quality of service test), an alternate advertisement could be displayed by invalidating the content segments. The content segments may be invalidated automatically if the content segments do not pass the quality of service test.

An example manifest file can include various data, such as a file header, metadata, and/or pointers/links. The data can be human-readable or coded using an encoded format, an encrypted format and/or computer readable (e.g., binary) format. The format of the data in the manifest file may be varied according to the design criteria of a particular implementation. The file header can provide an indicator to identify the manifest file as a particular type of file. For example, the file header may be used by the origin server, cache nodes, and/or any other computing device to recognize the manifest file as a particular type of file (e.g., a pointer file, a manifest file, etc.). The metadata may indicate the type of file to be served when following specified links. For example, the metadata may indicate that the links represent a video stream, a bandwidth needed to playback the content segments, the codecs implemented for the content segments, the resolution (e.g., in pixels) of the content segments, and/or any other relevant data. The type of data available in the metadata may be varied according to the design criteria of a particular implementation. The pointers may point to various types of stored data. The stored data may be the content segments. For example, a pointer can be an HTTP URL link. In some embodiments, the pointers may be implemented as a RTMP link and/or an FTP link. The format of the pointers may be varied according to the design criteria of a particular implementation. The pointers of the manifest file can point to the respective content segments. The content segments in some embodiments can be implemented as Transport Stream (e.g., .ts) files. For example, the content segments may comprise MPEG-2 data. In some embodiments, the manifest file may be embedded within the bitstreams. The type of invalidation and/or recovery may be varied according to the design criteria of a particular implementation. The type of invalidation may be based on the invalidation information (e.g., instructions) provided in the invalidation signal input. For example, the signal input may be a content invalidation signal initiated by the operator.

Content provides may include transcoding services to allow third parties to upload different content segments that may be stored and later distributed to users on request. Often, large numbers of files may be transcoded, which may have varying lengths, and processing such files end-to-end may not be feasible, and as a result, the transcoding operations are split between multiple compute nodes working in parallel. Such a configuration allows for faster than real time transcoding, because multiple portions of the content are processed simultaneously, but may lead to one or more transcoding failures or suboptimal transcodes. For example, without knowledge or information with respect to the video frames in the input content, it may be difficult to accurately align different content portions that are processed by different notes. By way of example, if different portions of content have different frame rates, it may be challenging to align those content portions without knowledge of the frame rate change and a time when the change occurs. Various other drawbacks exist with parallel processing, which systems and methods of the present disclosure have recognized and address.

Various embodiments are directed toward a transcoding system to obtain metadata from video frames to enable improved parallel transcoding operations, at least in part, and also to enable further benefits such as attaching extra data to individual frames, providing the consistency of two-pass encodes, and improving accuracy with accelerated transcoding processes. In at least one embodiment, a descriptive manifest (e.g., reconciliation manifest) may be created for reference to improve consistency and accuracy. Metadata may be extracted from frames during a demux or pseudo decode operation to obtain detailed metadata for individual frames. However, during this information capture, encoded video bits may be ignored or discarded. That is, video frames may not be fully decoded to extract the metadata. In at least some embodiments, video frames are only decoded and/or processed to the extent needed to extract metadata. As a result, traditionally slow operations may be increased by as much as a factor of 10. During a reconciliation operation, output from the initial process is normalized. In at least one embodiment, normalization may include retiming, drift detection, discontinuity detection, and other operations. The reconciliation manifest may then be used to reconcile and produce the transcoded video content.

Figure 3:
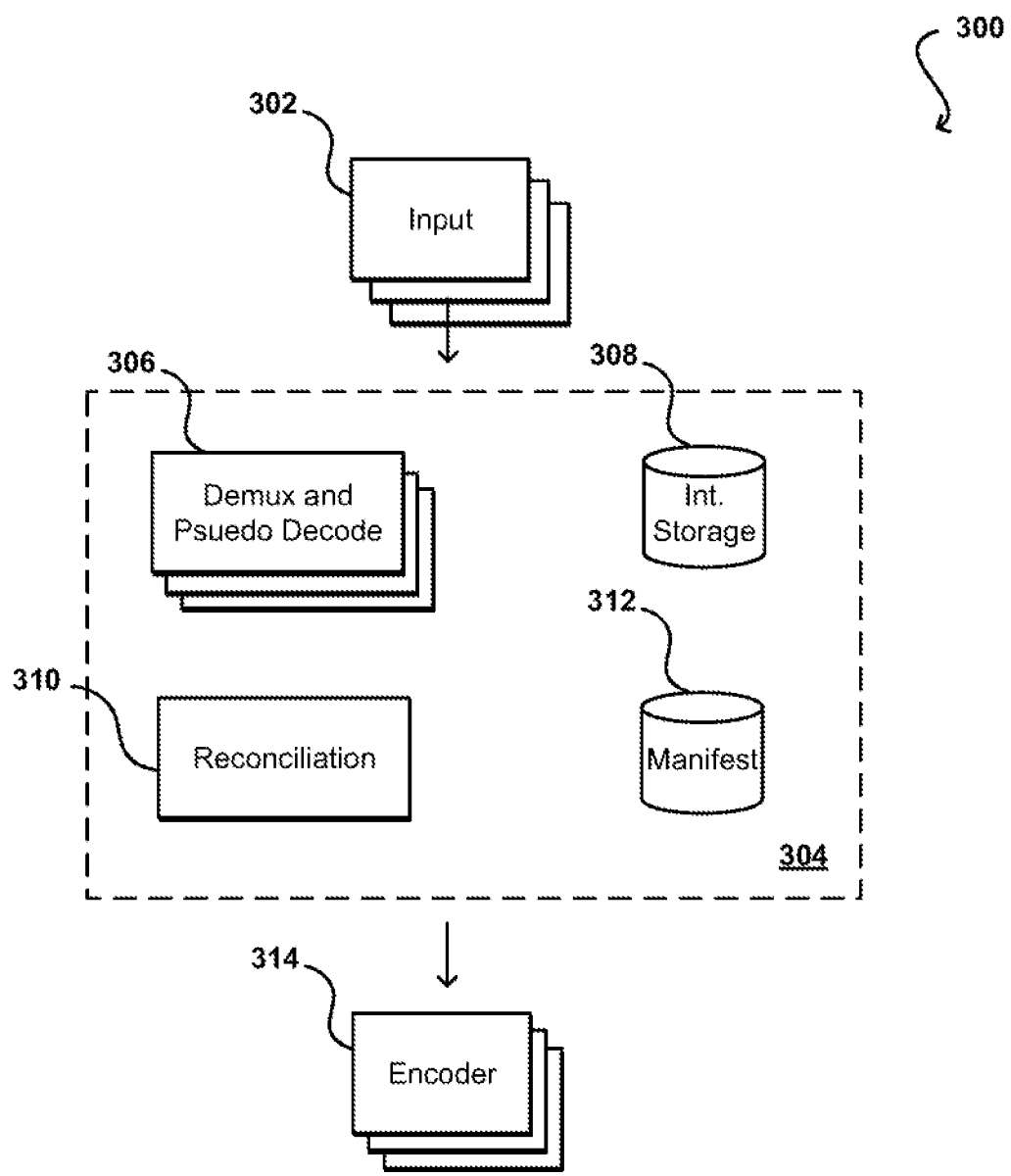
FIG. 3 illustrates an example subsystem for managing media file transcoding that can be utilized in accordance with various embodiments.

FIG. 3 illustrates an overview of an example system 300 that can be used to provide greater accuracy and consistency with parallel transcoding processes. In this example, an input 302, which may represent multiple different input files or input streams, may be provided to a transcoding environment 304. The input may include media files, as noted above, which may include, but are not limited to video media files. It should be appreciated that the input may be an encoded media file, such as an encoded video file, but in other embodiments may not be encoded. For example, the media file may be an uncompressed media file. In at least one embodiment, inputs 302 may be uploaded and stored by a content provider or, in other embodiments, may be accessed via a link or pointer to a storage repository hosted by or controlled by the content provider. Inputs 302 may be provided on demand, such as upon request from the content provider to begin one or more transcoding operations, or may be processed responsive to one or more determinations or events, such as an update to an existing media file, a newly added media file to a particular repository, or the like.

A demux and pseudo decode module 306, or multiple modules that may operate in parallel or at least in partially overlapping operations, may be utilized to split the media file into different elementary streams (e.g., audio, video, subtitles, etc.) and further to extract key data (e.g., metadata) from the elementary streams. For example, the frame data may be extracted from individual frames and include presentation time stamps, hashes of elementary stream data, frame types, frame duration, field counts, timecodes, data embedded into video elementary stream data, and other information. In various embodiments, frames are not fully decoded. In certain embodiments, even if frames are uncompressed, the frames may not be utilized for later operations corresponding to reconciliation manifest generation, as described below. Data extracted from each decodable frame may include the frame data. It should be appreciated that each decodable frame may be greater than or less than a number of demuxed frames. The module 306 may include a variety of different demuxers and decoders, as would be appreciated by one skilled in the art. In various embodiments, the demux and pseudo decode module 306 may be run on single node or spread out across multiple nodes. For example, a number of instances may be allocated in order to take a number of tasks corresponding to splitting the media content, for example to be within a threshold length. In at least one embodiment, one or more overlapping frames may be included within each of the split tasks.

The demux and pseudo decode module 306 may output frame data to one or more data stores 308. Output may be configured such that a reconciliation module 310 may be able to access and start consuming frame data once it is generated. In other words, the output may be progressively written. Accordingly, individual compressed frame associated with media content may be written to intermediate storage locations, such as the data store 308.

In one or more embodiments, reconciliation module 310 is utilized to take outputs from the module 306, such as output directly transmitted to the reconciliation module 310 and/or output stored in intermediate storage 308, and reconcile one or more discrepancies. By way of example, discrepancies may be associated with redundant frames, gaps (e.g., presentation time stamp gaps, timecode gaps, video frame gaps, etc.), timecoding errors, and others. In at least one embodiment, reconciliation module 310 may generate one or more reconciliation manifests that describes the frame data decoded/encoded by each instance. Thereafter, the reconciliation module 310 may store the reconciliation manifest in a reconciliation manifest data store 312. In at least one embodiment, an encoder 314, or multiple encoders 314 that may be run in parallel or at least in partially overlapping operations, may then utilize the reconciliation manifest to map output timecodes to input timecodes. Thereafter, encoded frames may be stored or transmitted to a user.

In at least one embodiment, reconciliation is executed on a single node and may also operate using in-memory data to enhance processing speeds. In at least one embodiment, input information, such as the frame data described above, is processed for various discrepancies. By way of example only, discrepancies may include evaluation of redundant frames, which may have been processed or analyzed due to splitting of a media file over multiple instances, where certain overlapping frames are included within the slips. Additionally, redundancies may also correspond to identification of duplicates based on presentation timestamps. Furthermore, one or more embodiments may include identification of gaps in presentation timestamps, where new frame data may be generated to represent frames that may be later duplicated to fill in gaps. Moreover, as noted, timecode fixes may also be applied during reconciliation, such as adding missing frames. Additionally, reconciliation may determine locations for splitting frames (e.g., choosing boundaries) and generating one or more reconciliation manifests that describe frame data to be further decoded and/or encoded by each instance Various embodiments of the reconciler may be directed toward one or more objects that holds a model, such as a JSON model, in memory. The reconciler may receive the JSON model as an input and then export another, modified, JSON model. In at least one embodiment, objects of the reconciler may further use detection and modifier objects to determine, at least in part, sections of the reconciliation manifest for modification and/or adjustment. In at least one embodiment, the reconciler outputs, at least in part, the reconciliation manifest that includes information related to discontinuities, timecode adjustments, and the like.

Figure 4:
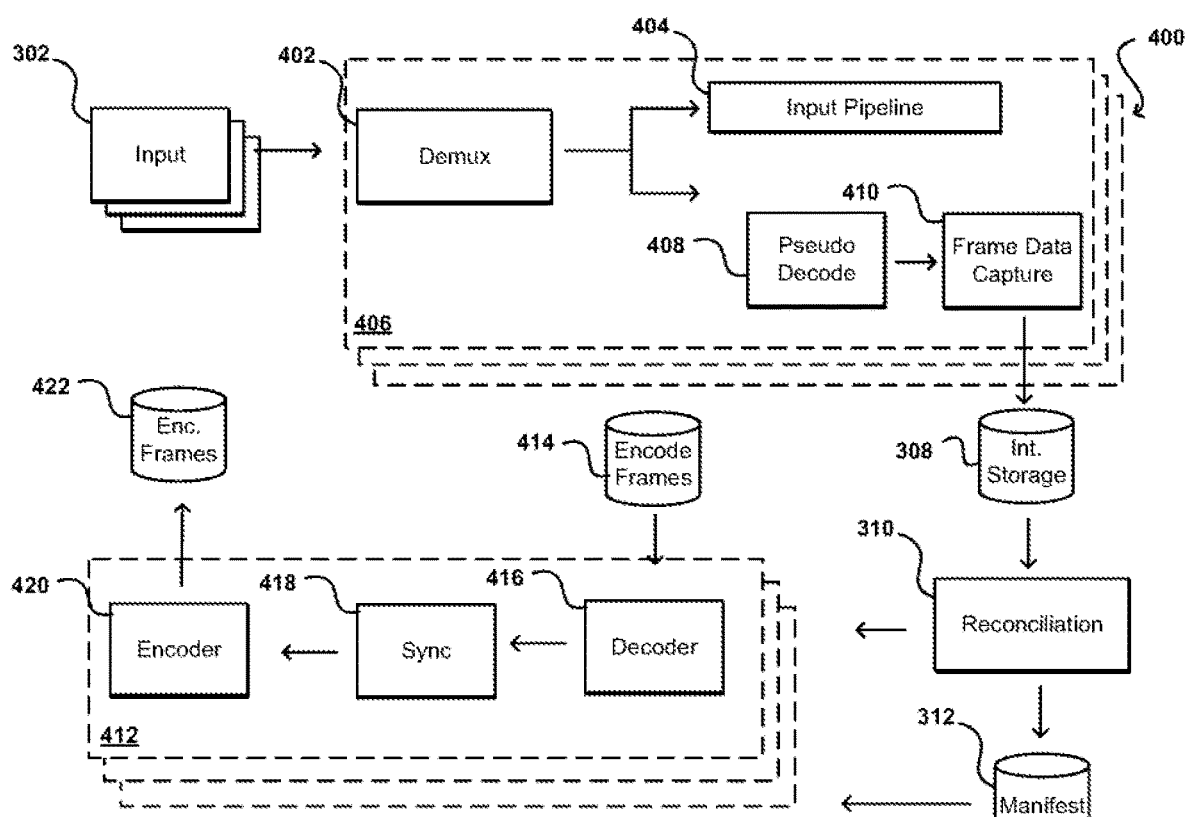
FIG. 4 illustrates an example subsystem for managing media file transcoding that can be utilized in accordance with various embodiments.

FIG. 4 illustrates an overview of an example pipeline 400 that can be used for one or more transcoding procedures. In this example, one or more components or features may be shared with FIG. 3, where like numerals may be used for convenience and not to limit the scope of the present disclosure. In this example, the input 302 is received at a demux module 402. In one or more embodiments, demux module 402 may form a portion of the module 306. As noted, demuxing is associated with separating different parts of a media file into elementary streams, such as audio streams, video streams, and the like. In at least one embodiment, demuxing may occur in parallel using a number of different nodes to process the input 302. In this example, an input pipeline 404 that does not utilize various embodiments of the present disclosure may receive the output of the demux module 402. For example, the input pipeline 404 may receive information that has a low likelihood of error or encoding problems, or that a content provider has selected for use straight into the input pipeline 404. Additionally, in various embodiments, input pipeline 404 may receive encoded portions that are not processed for extraction of metadata. The input pipeline 404 may receive portions of encoded frames for later processing.

In at least one embodiment, demux module 402 and input pipeline 404 may form at least a portion of a pre-reconciliation process 406 that further includes a pseudo decode module 408 and a frame data capture model 410, as will be described below. The pre-reconciliation process 406 may include multiple different instances that operate in parallel or semi-parallel with a common output to the intermediate storage 308. However, it should be appreciated that the common output location is shown for illustrative purposes and that, in other embodiments, different output locations may be utilized.

In this example, output from the demux module 402 may follow along multiple different paths, such as to the input pipe 404 or to a pseudo decode module 408 and a frame data capture module 410. In at least one embodiment, one or more software instructions executing on one or more processors may extract data from various frames of the input 302. The extracted information may be utilized separate from and independent to an uncompressed frame. In other words, the pseudo decode module 408 and a frame data capture module 410 may be used to extract metadata without processing or otherwise storing uncompressed frames, which may improve processing time as well as reduce storage requirements. The metadata, along with other information associated with processed frames, may then be stored within intermediate storage 308, but it should be appreciated that, in one or more embodiments, the intermediate storage 308 may be omitted or only receive portions of data.

The illustrated pipeline 400 further includes reconciliation module 310, which may evaluate information to reconcile discrepancies, as noted above. In various embodiments, reconciliation may hold information, such as within a memory device, and may also process information in any order. For example, various demuxers may be utilized and may provide information to intermediate storage 308 at different rates. Reconciliation module 310 may process the information "out of order" (e.g., in an order different from playback of media). A reconciliation manifest may be generated from reconciliation module 310 and stored within the reconciliation manifest data store 312, where the reconciliation manifest may be accessed during one or more additional processing steps.

In the illustrated embodiment, post-reconciliation processing 412 may fetch encoded frames from a data store 414 for processing. It should be appreciated that, in one or more embodiments, additional components may be part of or utilized with the post-reconciliation processing 412, such as additional demuxing operations, and the like. In at least one embodiment, the post-reconciliation processing 412 uses reconciliation manifest information from the reconciliation manifest data store 312. Information is passed to a decoder 416 for decoding and then to a video synchronization module 418. The video synchronization module 418 may also access the reconciliation manifest in order to align different portions of the video frames. In at least one embodiment, video synchronization module 418 may follow a set of steps or processes specified by the reconciliation manifest such that additional processing steps, such as drop/repeat frames and others may be omitted. Thereafter, the streams may be encoded 420 and then stored in an output data store 422. It should be appreciated that one or more portions of the post-reconciliation processing 412 may be performed in parallel and that, in various embodiments, the output data store 422 may also be considered part of the post-reconciliation processing 412 where multiple data stores 422 receive output frames from multiple encoders 420.

Figure 5:
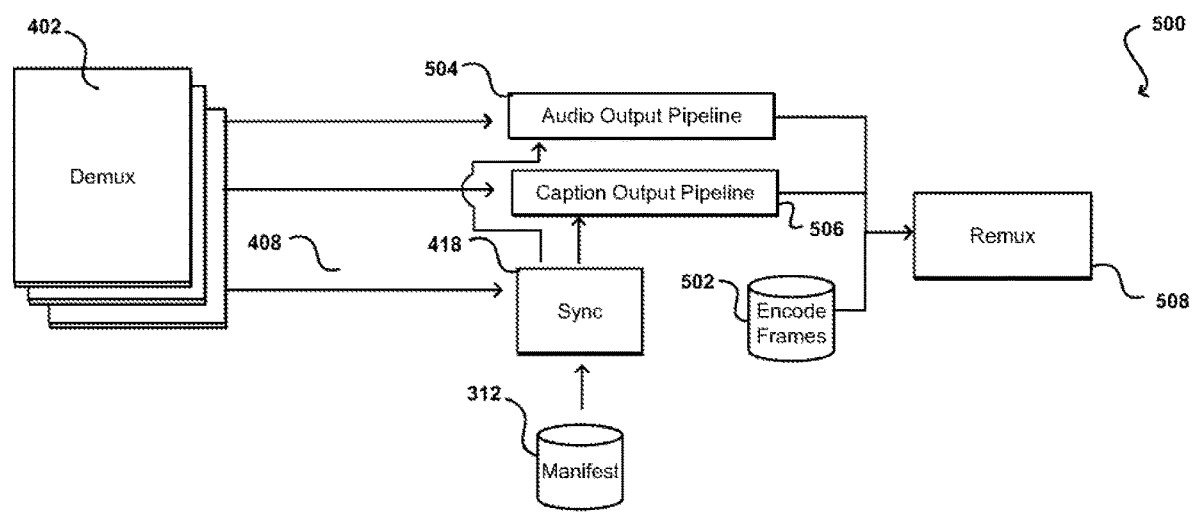
FIG. 5 illustrates an example subsystem for managing media file transcoding that can be utilized in accordance with various embodiments.

FIG. 5 illustrates an overview of an example system 500 that can be used for transcoding media data in accordance with various embodiments. In this example, media data is presented to the demuxer 402, such as the demuxers described above, that may split media data into different elemental streams. As noted above, one or more embodiments may extract metadata to generate a reconciliation manifest, which may be used during an encoding or remuxing process, which may be accomplished using one or more reconciliation modules (not pictured), described above.

In this example, the synchronizer 418 receives the reconciliation manifest from the data store 312 and may transmit information to output pipelines 504, 506. In at least one embodiment, one or more dummy or remux encoders may further be included within the pipeline 500, but have not been illustrated for clarity with the discussion. Encoding may be performed in accordance with reconciliation manifest information, such as duplicate frames, improperly processed frames, and the like are arranged in their intended order and position. Furthermore, various embodiments may enable parallel processing, where one or more tags or indications are arranged with segments that are utilized by different demuxers. By way of example, a tag associated with supplemental content may have a start time within a first segment and an end time within a second segment. Metadata associated with the tags may be included within the reconciliation manifest such that the encoded video stream may be provided with sufficient information for when to begin and end the supplemental content. In at least one embodiment, audio and caption output pipelines 504, 506 are processed in a continuous pass along with the video output associated with the synchronizer 418 and the encoder 420. Each of these streams may then be combined at a remuxer 508.

Figure 6:
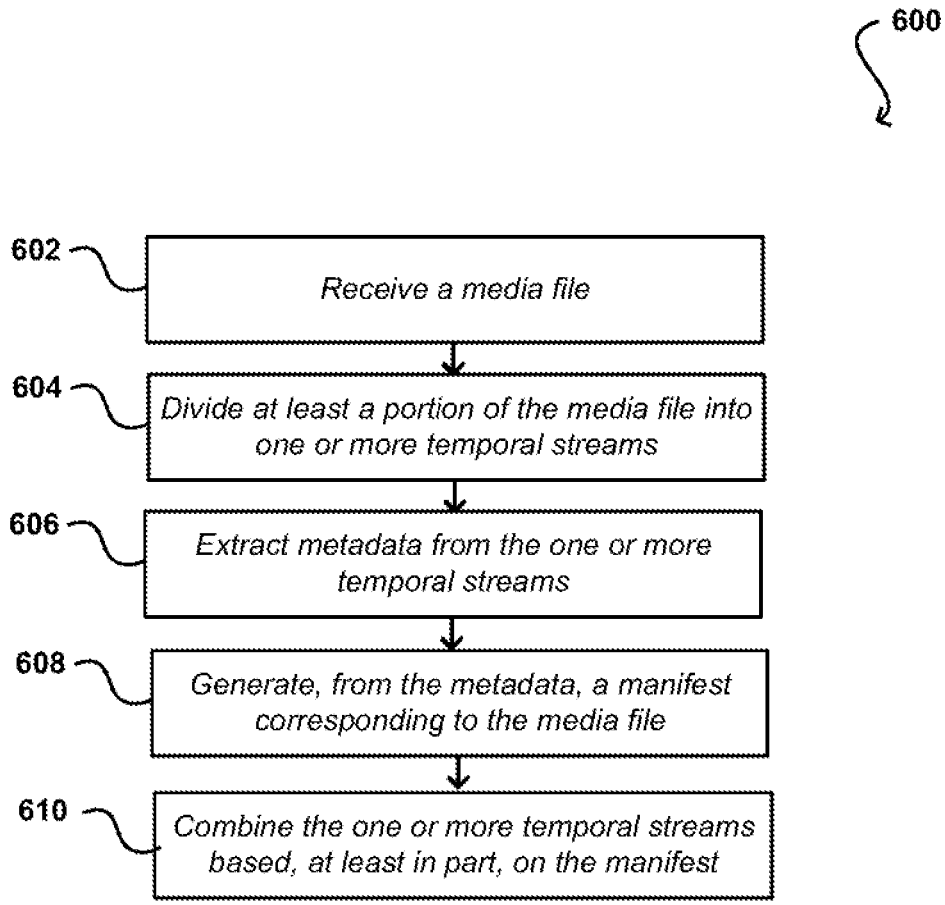
FIG. 6 illustrates an example process for transcoding a media file using a reconciliation manifest that can be utilized in accordance with various embodiments.

FIG. 6 illustrates an example process 600 for performing a transcoding process that can be utilized in accordance with various embodiments. It should be understood that for any process herein there can be additional, fewer, or alternative steps performed in similar or alternative orders, or in parallel, within the scope of the various embodiments unless otherwise specifically stated. In this example, a media file is received 602, which may be a media file stored in an online repository that is provided for transcoding. The media file may be a video file, audio file, text file, or combination thereof. In at least one embodiment, at least a portion of the media file is divided into one or more temporal streams 604. As mentioned, a demuxer may be used to split the media file into elementary streams. In certain embodiments, various demuxers may operate in parallel, where each demuxer operates on a portion of the media file. In at least one embodiment, a single demuxer is used. In an example, the media file may be split or divided into different temporal streams having a same or different duration, such as a three minute media file being split into three one minute segments.

Metadata may be extracted from the one or more temporal streams 606. The metadata may be extracted without fully processing the pixels of the temporal streams (for video streams), which may reduce a processing time and also storage requirements. As noted, metadata may correspond to various pieces of information regarding frames of the temporal stream, which may also be referred to as frame data. In at least one embodiment, a reconciliation manifest is generated corresponding to the media file 608. The reconciliation manifest may be formulated using the metadata to enable a downstream encoder to determine information for the media file, such as a time associated with different audio portions, start and stop times for different supplemental content, and the like. The reconciliation manifest may be used, as an input to an encoder or a remuxer, to combine the one or more temporal streams 610.

Figure 7:
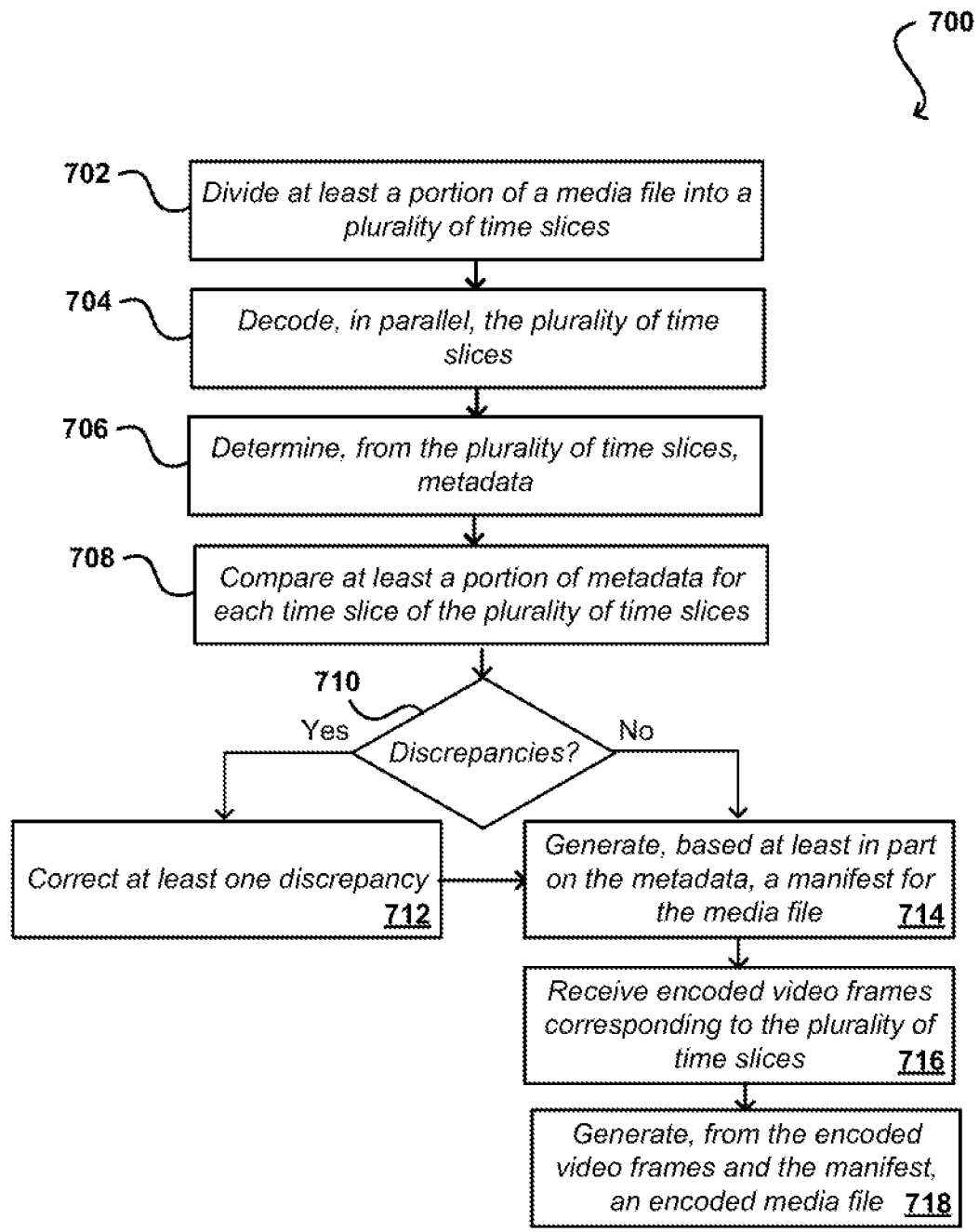
FIG. 7 illustrates an example process for generating an encoded media file using a reconciliation manifest that can be utilized in accordance with various embodiments.

FIG. 7 illustrates an example process 700 for a transcoding operation that can be utilized in accordance with various embodiments. In this example, at least a portion of a media file is divided into a plurality of time slices (e.g., slices, portions, durations, etc.) 702. Division of the media file into time slices may enable parallel processing in one or more steps of the transcoding process. In at least one embodiment, the plurality of time slices are decoded, in parallel 704. Metadata may also be extracted from the plurality of time slices 706. As mentioned, metadata may correspond to information that is extracted uncompressed frames, where the frames may be discarded. Metadata may correspond to information such as a hash of the elementary stream associated with the frame, a frame type, a frame duration, a field count, a timecode, or other associated information.

In various embodiments, metadata for different time slices may be compared to identify discrepancies 708. For example, different time slices of the plurality of time slices may include one or more overlapping portions. As a result, metadata for overlapping portions may be compared to determine whether decoding was successfully performed. In other embodiments, different frames may also be evaluated for discrepancies, which may correspond to frames that were corrupted, improperly decoded, and other potential errors. If may be determined whether such discrepancies exist 710, and if so, discrepancies may be corrected 712, such as by adding or removing frames, adjusting time codes, or other potential operations. It should be appreciated that information may be aggregated and/or collected from multiple different streams. If there are no discrepancies, or if discrepancies have been corrected, a reconciliation manifest may be generated for the media file 714. The reconciliation manifest may then be utilized along with encoded video frames 716 to generate an encoded media file 718.

Figure 8:
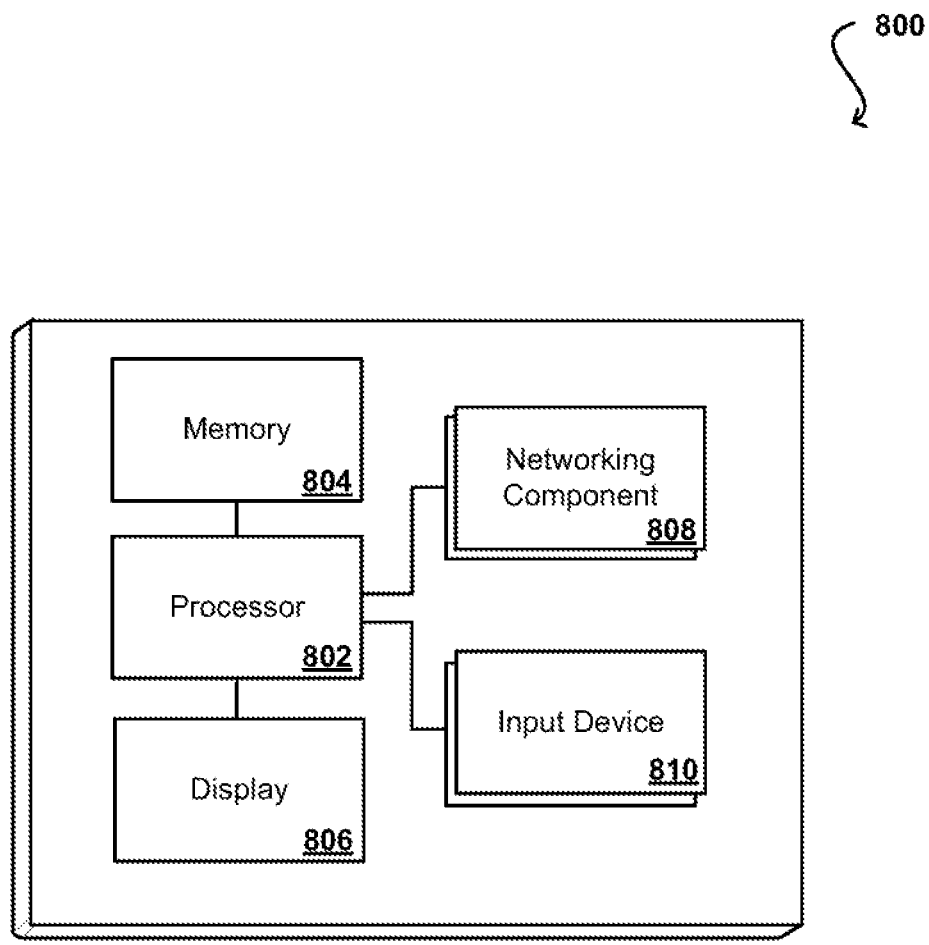
FIG. 8 illustrates example components of a computing device that can be used to implement aspects of various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
dividing at least a portion of a media file into a plurality of temporal streams;
extracting metadata from the plurality of temporal streams during transcoding of at least the portion of the media file, the metadata being extracted from a set of frames comprising decoded frames and frames that are at most partially decoded of the plurality of temporal streams;
determining, from the metadata, one or more discrepancies between two or more frames of the media files; and
generating, based at least in part on the metadata, a reconciliation manifest to correct the one or more discrepancies for the transcoding of at least the portion of the media file.

2. The computer-implemented method of claim 1, wherein the media file contains at least one of a video portion, an audio portion, or a text portion.

3. The computer-implemented method of claim 1, wherein the one or more discrepancies correspond to at least one of frame redundancy, gaps, timecode errors, drift, variable frame rate, or missing frames.

4. The computer-implemented method of claim 3, further comprising:
splitting the one or more temporal streams, for processing, between two or more nodes.

5. The computer-implemented method of claim 1, further comprising:
writing, to an intermediate storage location, one or more compressed frames corresponding to the one or more temporal streams.

6. A computer-implemented method, comprising:
transcoding, in parallel, a plurality of media time slices;
determining during the transcoding and from the plurality of media time slices, metadata corresponding to frames of the plurality of media time slices, the frames comprising decoded frames and frames that are at most partially decoded;
determining, from the metadata, one or more discrepancies between frames of the plurality of media time slices; and
generating, based at least in part on the metadata, a reconciliation manifest correcting the one or more discrepancies for the transcoding of the plurality of media times slices.

7. The computer-implemented method of claim 6, further comprising:
encoding an output media file based, at least in part, on the reconciliation manifest.

8. The computer-implemented method of claim 6, wherein the metadata is extracted from at least one of the decoded frames, partially decoded frames, or un-decoded frames of the plurality of media time slices.

9. The computer-implemented method of claim 6, wherein one or more uncompressed frames of the plurality of media time slices are not preserved after metadata extraction, the computer-implemented method further comprising:
storing at least a portion of the plurality of media time slices for reconstruction with the reconciliation manifest.

10. The computer-implemented method of claim 6, further comprising:
determining at least two frames of the plurality of media time slices overlap; and
removing at least one frame of the at least two frames.

11. The computer-implemented method of claim 6, further comprising:
synchronizing the frames of the plurality of media time slices based, at least in part, on the reconciliation manifest.

12. The computer-implemented method of claim 6, further comprising:
identifying, based at least in part on the metadata, a first tag corresponding to an insertion point for additional media content;
identifying, based at least in part on the metadata, a second tag corresponding to an end point for additional media content; and
adding, to the reconciliation manifest, the first tag and the second tag.

13. The computer-implemented method of claim 6, wherein the metadata corresponds to at least one of a hash for elementary stream data, a frame type, a frame duration, a field count, or a time code.

14. The computer-implemented method of claim 6, further comprising:
storing at least a portion of the metadata to an intermediate storage location.

15. A system, comprising:
at least one processor; and
memory including instructions that, when executed by the at least one processor, cause the system to:
transcode, in parallel, a plurality of media time slices;
determine during the transcoding and from the plurality of media time slices, metadata corresponding to frames of the plurality of media time slices, the frames comprising decoded frames and frames that are at most partially decoded;
determine, from the metadata, one or more discrepancies between frames of the plurality of media time slices; and
generate, based at least in part on the metadata, a reconciliation manifest correcting the one or more discrepancies for the transcoding of the plurality of media times slices.

16. The system of claim 15, wherein the instructions when executed further cause the system to:

encode an output media file based, at least in part, on the reconciliation manifest.

17. The system of claim 15, wherein the metadata is extracted from the at least one of decoded frames, partially decoded frames, or un-decoded frames of the plurality of media time slices.

18. The system of claim 15, wherein the instructions when executed further cause the system to:
- determine at least two frames of the plurality of media time slices overlap; and
- remove at least one frame of the at least two frames.

19. The system of claim 15, wherein the instructions when executed further cause the system to:
- identify, based at least in part on the metadata, a first tag corresponding to an insertion point for additional media content;
- identify, based at least in part on the metadata, a second tag corresponding to an end point for additional media content; and
- add, to the reconciliation manifest, the first tag and the second tag.

20. The system of claim 15, wherein the metadata corresponds to at least one of a hash for elementary stream data, a frame type, a frame duration, a field count, or a time code.

* * * * *